(12) United States Patent
Zhang et al.

(10) Patent No.: US 11,914,515 B2
(45) Date of Patent: Feb. 27, 2024

(54) CACHE MEMORY DEVICE AND DATA CACHE METHOD

(71) Applicant: Shanghai Zhaoxin Semiconductor Co., Ltd., Shanghai (CN)

(72) Inventors: Junjie Zhang, Beijing (CN); Mengchen Yang, Beijing (CN); Jing Qiao, Beijing (CN); Jianbin Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 23 days.

(21) Appl. No.: 18/048,161

(22) Filed: Oct. 20, 2022

(65) Prior Publication Data
US 2023/0169004 A1 Jun. 1, 2023

(30) Foreign Application Priority Data
Dec. 1, 2021 (CN) .......................... 202111451778.0

(51) Int. Cl.
*G06F 12/0846* (2016.01)
*G06F 12/0875* (2016.01)

(52) U.S. Cl.
CPC ...... *G06F 12/0846* (2013.01); *G06F 12/0875* (2013.01)

(58) Field of Classification Search
None
See application file for complete search history.

(56) References Cited

U.S. PATENT DOCUMENTS

| 2006/0288151 A1* | 12/2006 | McKenney | ......... G06F 12/1063 711/3 |
| 2014/0181476 A1* | 6/2014 | Srinivasan | ............ G06F 9/3838 712/208 |

FOREIGN PATENT DOCUMENTS

CN  102169429 A * 8/2011 ......... G06F 12/0862

* cited by examiner

*Primary Examiner* — Brian R Peugh
(74) *Attorney, Agent, or Firm* — McClure, Qualey & Rodack, LLP

(57) ABSTRACT

A cache memory device is provided in the disclosure. The cache memory device includes a first AGC, a compression circuit, a second AGC, a virtual tag array, and a comparator circuit. The first AGC generates a virtual address based on a load instruction. The compression circuit obtains the higher part of the virtual address and generates a target hash value based on the higher part of the virtual address. The second AGC generates the lower part of the virtual address based on the load instruction. The virtual tag array obtains the lower part and selects a set of memory units. The comparator circuit compares the target hash value to a hash value stored in each memory unit of the set of memory units. When the comparator circuit generates the virtual tag miss signal, the comparator circuit transmits the virtual tag miss signal to the reservation station.

18 Claims, 4 Drawing Sheets

CACHE MEMORY DEVICE AND DATA CACHE METHOD

CROSS REFERENCE TO RELATED APPLICATIONS

This application claims priority of CN Patent Application No. 202111451778.0 filed on Dec. 1, 2021, the entirety of which is incorporated by reference herein.

BACKGROUND

Technical Field

The application generally relates to cache technology, and more particularly, to an image cache technology in which a virtual tag array is configured in the memory order buffer (MOB) circuit, and when the virtual tag miss occurs, the reservation station will be notified previously.

Description of the Related Art

In current processors, a first level cache (L1 cache) plays an important role for memory accesses. The L1 cache is usually configured in the front-end of the pipeline, and therefore, when the data cache is performed in the L1 cache, lower delay is needed.

However, in a traditional processor, when a cache miss occurs, a replay operation is needed. This replay penalty may seriously affect processor performances, and the more pipeline stages a processor has, the more replay penalties the processor will pay. There may exist an instruction dependency between a store instruction and others such that a lots of wait cycles may be necessary before replaying a load instruction. And, the more wait cycles the load instruction replay needs, the more penalties the processor will pay.

In addition, when the load instruction needs to be replayed, the load instruction needs to be passed back again through the relevant pipeline stages, and thus takes more time periods. If more pipeline stages are needed to pass back the load instruction, it may cost more cycles to perform the load instruction, which causes more penalties to processor performance.

Therefore, when the cache miss occurs, how to process the load instruction more efficiently is a subject which is worth discussing.

BRIEF SUMMARY

Cache memory device and data cache method are provided to overcome the problems mentioned above.

An embodiment of the application provides a cache memory device. The cache memory device includes a reservation station and a memory order buffer (MOB) circuit. The reservation station outputs a load instruction. The MOB circuit is coupled to the reservation station. The MOB circuit includes a first address generation circuit (AGC), a compression circuit, a second AGC, a virtual tag array and a comparator circuit. The first AGC generates a virtual address based on the load instruction from the reservation station. The compression circuit is coupled to the first AGC. The compression circuit obtains the higher part of the virtual address from the first AGC and generates a target hash value based on the higher part of the virtual address. The second AGC generates the lower part of the virtual address based on the load instruction. The virtual tag array is coupled to the second AGC. The virtual tag array obtains the lower part of the virtual address from the second AGC and selects a set of memory units from the virtual tag array. The comparator circuit is coupled to the compression circuit and the virtual tag array. The comparator circuit compares the target hash value to a hash value stored by each memory unit in the set of memory units to generate a virtual tag hit signal or a virtual tag miss signal. When the comparator circuit generates the virtual tag miss signal, the comparator circuit transmits the virtual tag miss signal to the reservation station to indicate the reservation station to reserve information related to the load instruction.

An embodiment of the application provides a data cache method. The data cache method is applied in a cache memory device. The data cache method includes the steps of using a reservation station of the cache memory device to output a load instruction to a memory order buffer (MOB) circuit of the cache memory device; using a first address generation circuit (AGC) of the MOB circuit to generate a virtual address based on the load instruction from the reservation station; using a compression circuit of the MOB circuit to obtain the higher part of the virtual address from the first AGC and generate a target hash value based on the higher part of the virtual address; using a second AGC of the MOB circuit to generate the lower part of the virtual address based on the load instruction; using a virtual tag array of the MOB circuit to obtain the lower part of the virtual address from the second AGC and select a set of memory units from the virtual tag array; using a comparator circuit of the MOB circuit to compare the target hash value to a hash value stored by each memory unit of the set of memory units to generate a virtual tag hit signal or a virtual tag miss signal; and when the comparator circuit generates the virtual tag miss signal, using the comparator circuit to transmit the virtual tag miss signal to the reservation station to indicate the reservation station to reserve information related to the load instruction.

BRIEF DESCRIPTION OF THE DRAWINGS

The application will become more fully understood by referring to the following detailed description with reference to the accompanying drawings, wherein.

DETAILED DESCRIPTION

The following description is of the best-contemplated mode of carrying out the application. This description is made for the purpose of illustrating the general principles of the application and should not be taken in a limiting sense. The scope of the application is best determined by reference to the appended claims.

Figure 1:
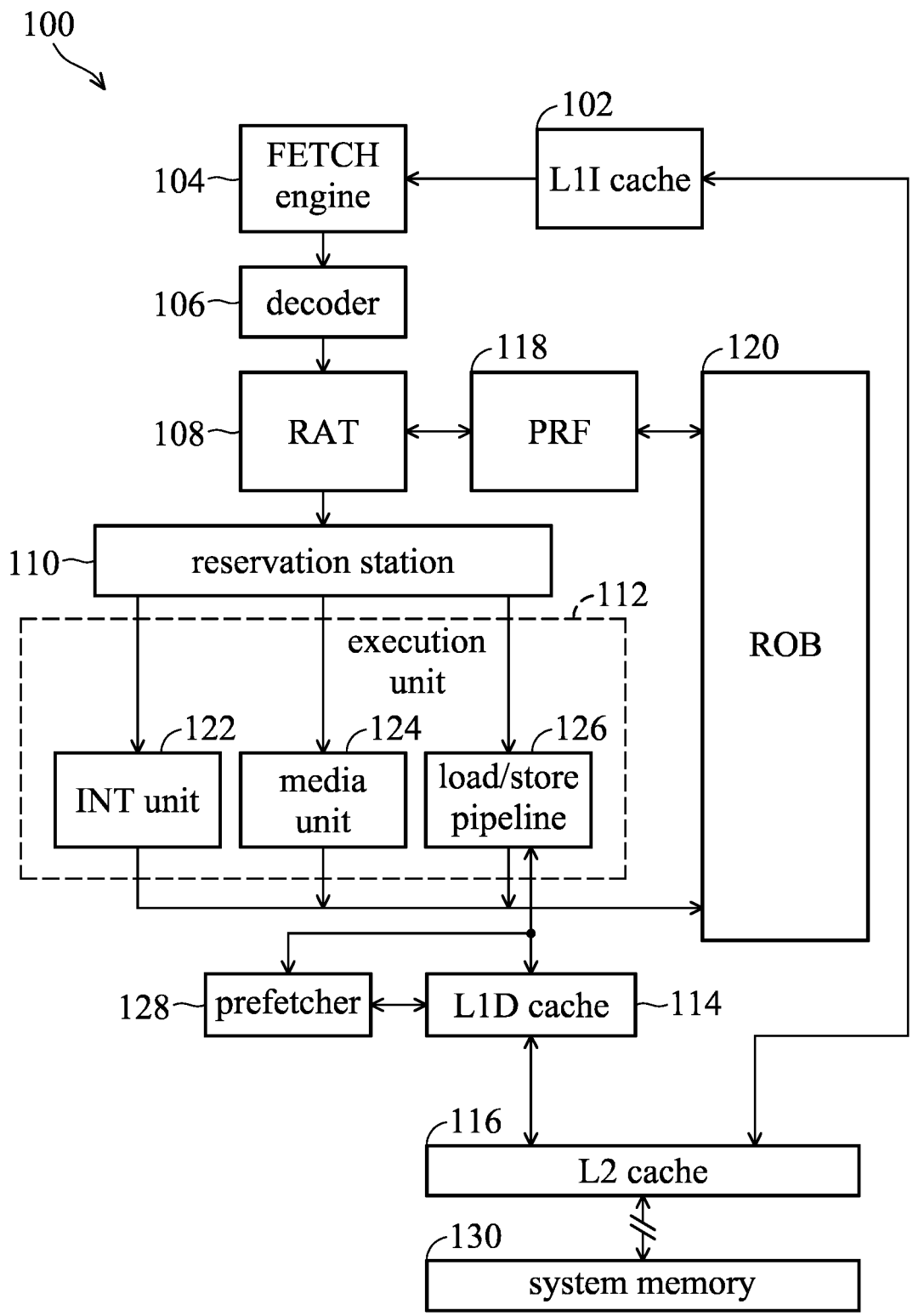
FIG. 1 is a block diagram of a processor 100 according to an embodiment of the application.

FIG. 1 is a block diagram of a processor 100 according to an embodiment of the application. As shown in FIG. 1, the processor 100 may comprise a first level or level-1 instruction (L1I) cache 102, an instruction fetch (FETCH) engine 104, a decoder 106, a register alias table (RAT) 108, a reservation station 110, an execution unit 112, a level-1 data (L1D) cache 114, a second level or level-2 (L2) cache 116, a physical register file (PRF) 118 and a reorder buffer (ROB)

120. It should be noted that FIG. 1 presents a simplified block diagram in which only the elements relevant to the application are shown. However, the application should not be limited to what is shown in FIG. 1. The processor 100 may also comprise other elements.

In addition, as shown in FIG. 1, execution units 112 may include one or more integer (INT) units 122, one or more floating point or media units 124, and one or more load and store (load/store) pipelines 126. The load/store pipelines 126 may be configured as separate load pipelines or store pipelines, and/or load and store combination pipelines, and may further incorporate a memory order buffer (MOB) (not shown) or the like. The load/store pipelines 126 (one or more memory access pipelines) form a memory access execution system that executes memory access instructions, which may include load instructions to retrieve data from, and store instructions to store data to, the system memory 130 via any intermediate cache memories. The reservation stations 110 may include any combination of schedulers for dispatching instructions to the individual execution units 112. For example, separate integer, media and load/store schedulers may be included for dispatching instructions to the INT units 122, the media units 124 and the load/store pipelines 126, respectively.

The L1I cache 102 is a level-1 (L1) cache for handling program instructions or code retrieved from the system memory 130, whereas the L1D cache 114 is an L1 cache for handling data retrieved from or sent to the system memory 130. The L2 cache 116, on the other hand, may comprise instruction cache and data cache. The L2 cache 11 incorporates both data and code information to and from the L1I cache 102 and L1D cache 114. In such a cache hierarchy, the L1 caches are typically smaller and faster with fewer sets or ways therein, whereas the higher level caches (e.g., L2) are larger (and often slower) with more sets or ways than L1 caches. The processor 100 executes load instructions with an address for accessing the requested information (e.g., data or instructions). When the requested information is located in a corresponding L1 cache invoking a cache hit, the information is retrieved with minimal latency. Otherwise, if the requested information is located within the L2 cache 116, the information is retrieved with less latency than retrieved from higher level caches since the L2 is faster than any higher level caches (not shown) and/or system memory 130. Otherwise, if a cache miss occurs (in L2 cache), the information is retrieved from higher level caches and/or the system memory 130 with greater latency. The retrieved information may be one or more cache lines incorporating the requested information. A prefetcher may be employed to prefetch data from and/or store to one, more, or all of the cache memories, including the L1I cache 102, the L1D cache 114, and the L2 cache 116 by monitoring information (data and/or instruction) transactions actually requested and/or retrieved by the processor 100 and to predict future requests, and then submits requests to retrieve the predicted information.

Figure 2:
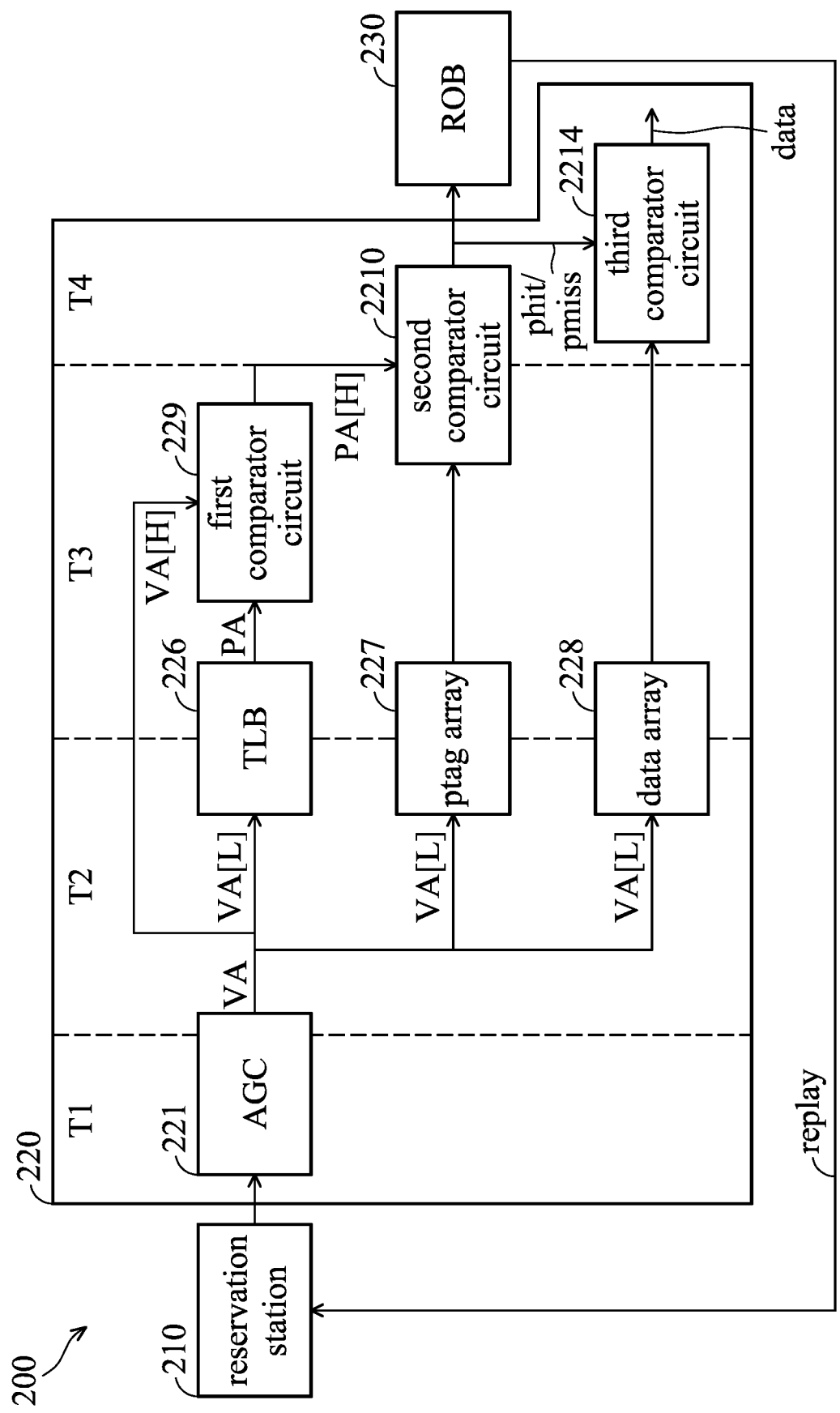
FIG. 2 is a block diagram of a cache memory device 200 according to an embodiment of the application.

FIG. 2 is a block diagram of a cache memory device 200 according to an embodiment of the application. As shown in FIG. 2, the cache memory device 200 may at least comprise a reservation station 210, a MOB circuit 220 and a ROB 230. It should be noted that FIG. 2 presents a simplified block diagram in which only the elements relevant to the application are shown. However, the application should not be limited to what is shown in FIG. 2. The cache memory device 200 may also comprise other elements. The cache memory device 200 may be applied in L1 cache and a set-associative catch structure. In addition, the MOB circuit 220 may be applied in the load/store pipelines 126 and the L1D cache 114 shown in FIG. 1.

As shown in FIG. 2, according to an embodiment of the application, the MOB circuit 220 may at least comprise an address generation circuit (AGC) 221, a translation lookaside buffer (TLB) 226, a physical tag (ptag) array 227, a data array 228, a first comparator circuit 229, a second comparator circuit 2210 and a third comparator circuit 2214. It should be noted that the MOB circuit 220 of FIG. 2 presents a simplified block diagram in which only the elements relevant to the application are shown. However, the application should not be limited to what is shown in FIG. 2. The MOB circuit 220 may also comprise other elements.

According to an embodiment of the application, during the first clock period T1, the reservation station 210 outputs a load instruction to the MOB circuit 220. When the MOB circuit 220 receives the load instruction, the AGC 221 generates a virtual address (VA) based on the load instruction, e.g., the virtual address may be VA [47:0].

During the second clock period T2, the TLB 226, the ptag array 227, the data array 228 may respectively obtain the lower part (or index part) VA[L] (e.g., VA[11:0]) from the virtual address VA generated by the AGC 221 to select a set of corresponding memory units from the TLB 226, the ptag array 227 and the data array 228 (the selected memory units is not shown in FIG. 2) to support the operations of determining whether the physical tag hit or physical tag miss occurs.

During the third clock period T3, the first comparator 229 may obtain the higher part (or tag part) VA[H] (e.g., VA[47:12]) from the virtual address VA generated by the AGC 221 and determine whether the higher part VA[H] hits one way of the set of memory units selected based on the lower part VA[L] in the TLB 226 (the selected memory units is not shown in FIG. 2). If a "hit" occurs, the first comparator 229 may obtain the physical address PA corresponding (or mapping) to the higher part VA[H] from the TLB 226 and transmit the physical address PA to the second comparator circuit 2210. The second comparator circuit 2210 may determine whether the higher part PA[H] (e.g., VA[45:12]) of the physical address PA hits one way of the set of memory units selected based on the lower part VA[L] in the ptag array 227. If a "hit" occurs, the second comparator circuit 2210 may assert a physical tag hit signal phit, and transmit the physical tag hit signal phit to the third comparator circuit 2214. If the "hit" does not occur, the second comparator circuit 2210 may generate a physical tag miss signal pmiss, and transmit the physical tag miss signal pmiss to the ROB 230.

The ptag array 227 and the data array 228 of the MOB circuit 220 may be comprised in the L1D cache 114 of FIG. 1 and other elements of the MOB circuit 220 may be comprised in the load/store pipelines 126 of FIG. 1.

Figure 3:
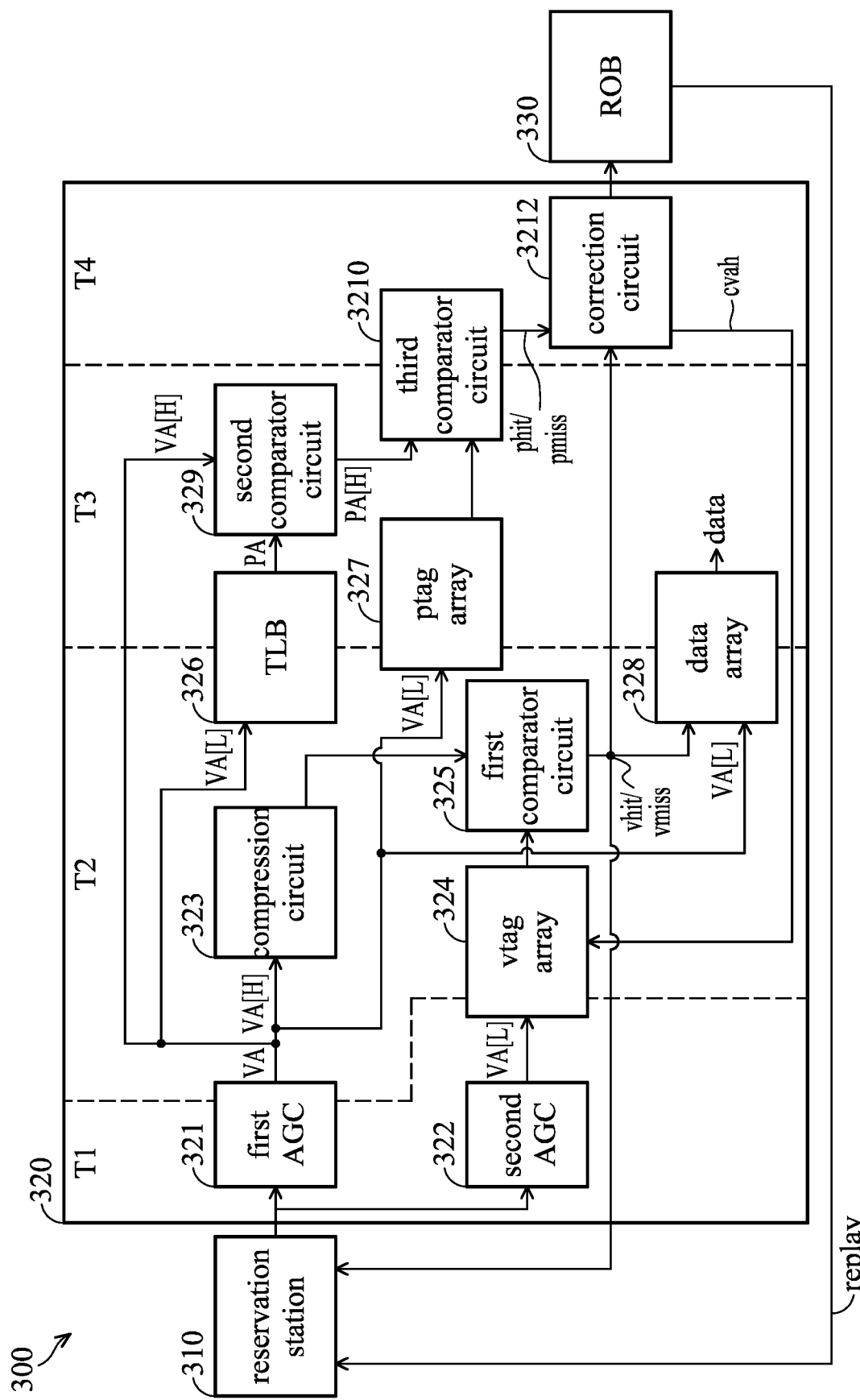
FIG. 3 is a block diagram of a cache memory device 300 according to an embodiment of the application.

FIG. 3 is a block diagram of a cache memory device 300 according to an embodiment of the application. As shown in FIG. 3, the cache memory device 300 may at least comprise a reservation station 310, a MOB circuit 320 and a ROB 330. It should be noted that FIG. 3 presents a simplified block diagram in which only the elements relevant to the application are shown. However, the application should not be limited to what is shown in FIG. 3. The cache memory device 300 may also comprise other elements. The cache memory device 300 may be applied in L1 cache and a set-associative catch structure. In addition, the MOB circuit 320 may be applied in the load/store pipelines 126 and the L1D cache 114 shown in FIG. 1.

As shown in FIG. 3, according to an embodiment of the application, the MOB circuit 320 may at least comprise a first AGC 321, a second AGC 322, a compression circuit 323, a virtual tag (vtag) array 324, a first comparator circuit 325, a TLB 326, a physical tag (ptag) array 327, a data array 328, a second comparator circuit 329, a third comparator circuit 3210 and a correction circuit 3212. It should be noted that the MOB circuit 320 of FIG. 3 presents a simplified block diagram in which only the elements relevant to the application are shown. However, the application should not be limited to what is shown in FIG. 3. The MOB circuit 320 may also comprise other elements.

According to an embodiment of the application, during the first clock period T1, the reservation station 310 outputs a load instruction to the MOB circuit 320. When the MOB circuit 320 receives the load instruction, the first AGC 321 may generate the virtual address VA based on the load instruction, e.g., the virtual address VA may be VA [47:0]. The second AGC 322 may generate the lower part VA[L] of the virtual address VA based on the load instruction, e.g., the lower part VA[L] of the virtual address may be VA [11:0].

Specifically, the second AGC 322 may obtain the index (e.g., VA[11:6]) from the lower part VA[L] of the virtual address to determine which set of memory units of the vtag array 324 is selected. That is to say, when the second AGC 322 accesses the vtag array 324, the vtag array 324 may determine that the index corresponds to which set of the memory units of the vtag array 324 during the second clock period T2 based on the index obtained from the lower part VA[L] of the virtual address VA by the second AGC 322 during the first clock period T1 (i.e., the vtag array may determine which set of memory units of the vtag array 324 is selected).

During the second clock period T2, the compression circuit 323 may obtain the higher part VA[H] (e.g., VA[47:12]) of the virtual address VA (e.g., VA[47:0]) from the virtual address generated by the first AGC 321. Then the compression circuit 323 may compress the higher part VA[H] to generate a target hash value corresponding to the higher part VA[H]. For example, the compression circuit 323 may compress 36-bit higher part VA[H] (e.g., VA[47:12]) to generate 9-bit target hash value corresponding to the higher part VA[H].

According to the embodiment of the application, the vtag array 324, the ptag array 327 and the data array 328 have the same array structure, e.g., the ptag array 327 and the data array 328 are 64×8 arrays and the vtag array 324 is also 64×8 array, but the application should not be limited thereto. According to the embodiment of the application, each column of memory units of the ptag array 327 corresponds to each set of memory units of the data array 328 and each row of memory units of the ptag array 327 corresponds to each way of memory units of the data array 328. Each memory unit of the ptag array 327 may store the higher part PA[H] (e.g., PA[45:12]) of the physical address PA (e.g., PA[45:0]), i.e., the tag of the physical address PA. Unlike ptag array 327, each memory unit of the vtag array 324 may store the hash value corresponding to the tag of the virtual address. For example, each memory unit of the vtag array 324 may store 9-bit hash value which is generated by compressing 36-bit higher part VA[H] of the virtual address.

During the second clock period T2, the first comparator circuit 325 may compare the target hash value generated by the compression circuit 323 to the hash value in each memory unit of the selected set of memory units of the vtag array 324 to determine whether the target hash value hits one way of the set of memory units. When the target hash value hits one way of the set of memory units, the first comparator circuit 325 may generate a virtual tag hit signal vhit. When the target hash value does not hit one way of the set of memory units, the first comparator circuit 325 may generate a virtual tag miss signal vmiss.

When the first comparator circuit 325 generates a virtual tag miss signal vmiss, the first comparator circuit 325 may transmit the virtual tag miss signal vmiss to the reservation station 310 to indicate the reservation station 310 to reserve the information related to the load instruction.

According to the embodiment of the application, during the second clock period T2, when the virtual tag miss occurs, the MOB circuit 320 may notify the reservation station 310 that the "cache miss" may occur. When the reservation station 310 knows that the "cache miss" occurs, the reservation station 310 may reserve the information related to the load instruction without releasing the information related to the load instruction in the pipeline to avoid cache pollution. In addition, in the embodiment of the application, when the virtual tag miss occurs, the reservation station 310 has been notified during the second clock period T2, and therefore, the time of the ROB 330 triggering the replay operation will be saved. Furthermore, in conventional "physical tag miss", the reservation station 310 may not be notified previously. In addition, the MOB circuit 220 recognizes that the "physical tag hit" occurs or the "physical tag miss" occurs during the fourth clock period T4. However, the MOB circuit 320 may know whether the "virtual tag hit" occurs during the second clock period T2. Therefore, the processing time for the "cache miss" will be reduced and the power consumption of the cache memory device 300 will be reduced.

According to the embodiment of the application, during the third clock period T3, the TLB 326, the ptag array 327 and the data array 328 may obtain the lower part (or index part) VA[L] (e.g., VA[11:0]) of the virtual address VA from the virtual address VA generated by the first AGC 321 respectively to select the corresponding set of memory units in the TLB 326, the ptag array 327 and the data array 328 to support the later operations of determining whether the physical tag hit or physical tag miss occurs.

The second comparator circuit 329 may obtain the higher part (tag part) VA[H] (e.g., VA[47:12]) of the virtual address VA from the virtual address VA generated by the first AGC 321 and determine whether the higher part VA[H] hits one way of the set of memory units which are selected based on the lower part (index part) VA[L] in the TLB 326. If the higher part VA[H] hits one way of the set of memory units, the second comparator circuit 329 may obtain the physical address PA corresponding to (or mapping to) the higher part VA[H] from the TLB 326, and transmit the physical address PA to the third comparator circuit 3210. The third comparator circuit 3210 may determine whether the higher part PA[H] (e.g., PA[45:12]) of the physical address PA hits one way of the set of memory units which are selected based on the lower part (index part) VA[L] in the ptag array 327. If the higher part PA[H] hits one way of the set of memory units, the third comparator circuit 3210 may assert the physical tag hit signal phit, and if the higher part PA[H] does not hit any one way of the set of memory units, the third comparator circuit 3210 may assert the physical tag miss signal pmiss. The third comparator circuit 3210 may transmit the physical tag hit signal phit or the physical tag miss signal pmiss to the correction circuit 3212.

According to an embodiment of the application, when the first comparator circuit 325 may assert the virtual tag hit signal vhit, the first comparator circuit 325 may transmit the virtual tag hit signal vhit to the correction circuit 3212 of the MOB circuit 320. In addition, the correction circuit 3212 may receive the physical tag hit signal phit or the physical tag miss signal pmiss from the third comparator circuit 3210.

According to an embodiment of the application, during the fourth clock period T4, when the correction circuit 3212 receives the virtual tag hit signal vhit and the physical tag hit signal phit, the correction circuit 3212 may determine whether the first hit information (i.e., which set and which way of the vtag array 324 is hit) corresponding to the virtual tag hit signal vhit matches the second hit information (i.e., which set and which way of the ptag array 327 is hit) corresponding to the physical tag hit signal phit.

When the first hit information matches the second hit information, the correction circuit 3212 may not transmit information to the ROB 330.

When the first hit information does not match the second hit information (e.g., it hits different ways, i.e., a misjudgment occurs in the vtag array 324), the correction circuit 3212 may update the vtag array 324 based on the second hit information. Specifically, the correction circuit 3212 may know which way is actually hit based on the second hit information. Therefore, the correction circuit 3212 may compress the high part of the virtual address corresponding to the way, and take the compressed high part cvah of the virtual address corresponding to the way to be the information for updating the vtag array 324. If a following load instruction needs to use the same cached way for execution, correct data may be accessed therefrom. The correction circuit 3212 may transmit the virtual tag hit signal vhit, the physical tag hit signal phit and synchronization information (i.e., which way is hit really) to the ROB 330. The ROB 330 may transmit the replay signal to the reservation station 310 based on the virtual tag hit signal vhit, the physical tag hit signal phit and synchronization information to replay the load instruction again. In the embodiment, the correction circuit 3212 may determine whether the first hit information matches the second hit information, which may thus avoid later operations from being affected by any misadjustment in the vtag array 324.

In another embodiment, when the correction circuit 3212 receives the virtual tag hit signal vhit and the physical tag miss signal pmiss, the correction circuit 3212 may transmit the virtual tag hit signal vhit and the physical tag miss signal pmiss to the ROB 330. The ROB 330 may transmit the replay signal to the reservation station 310 based on the virtual tag hit signal vhit and the physical tag miss signal pmiss to replay the load instruction again.

According to an embodiment of the application, the vtag array 324, the ptag array 327 and the data array 328 of the MOB circuit 320 may be comprised in the LID cache 114 of FIG. 1, and other elements of the MOB circuit 320 may be comprised in the load/store pipelines 126 of FIG. 1.

Figure 4:
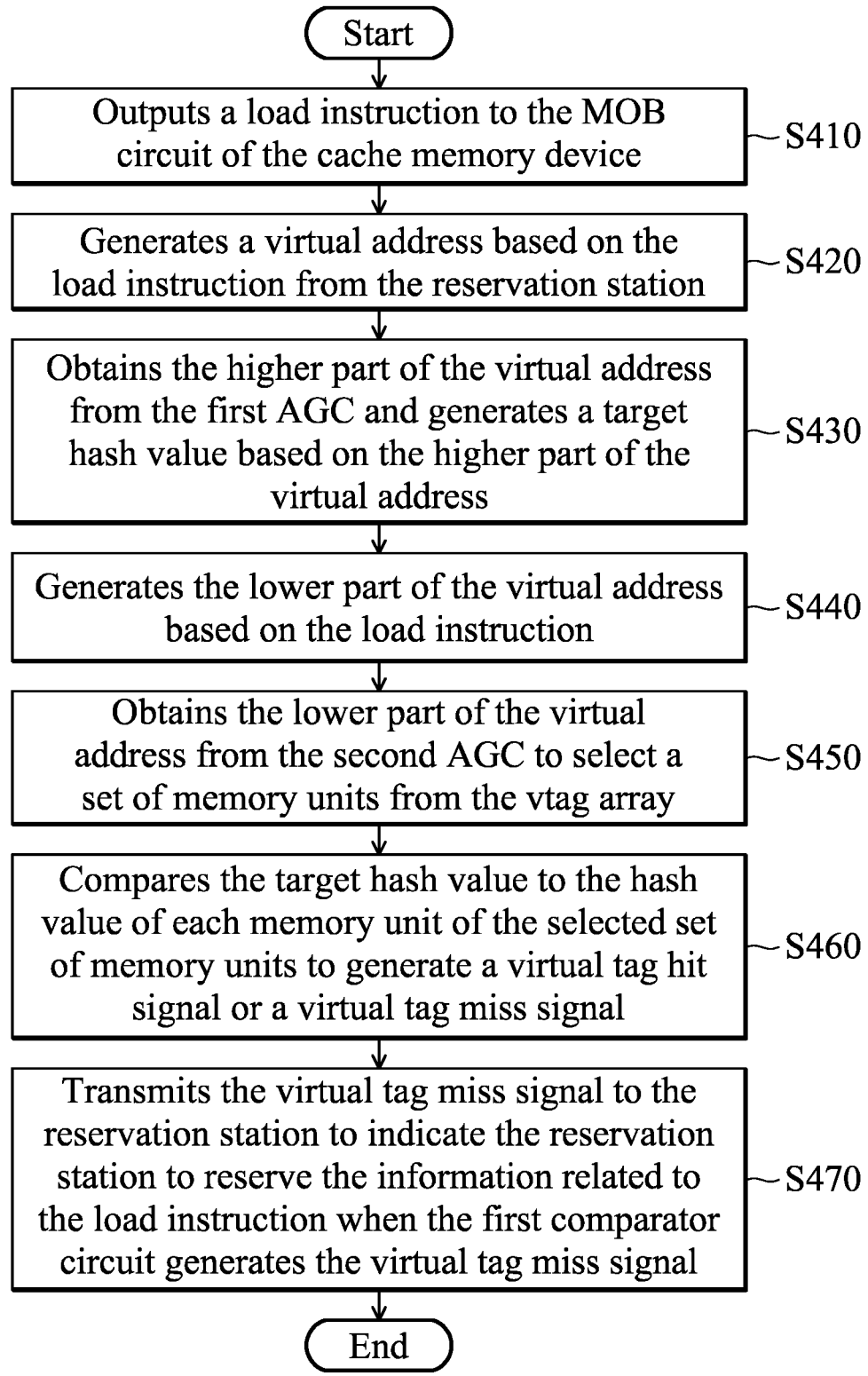
FIG. 4 is a flow chart illustrating a data cache method according to an embodiment of the application.

FIG. 4 is a flow chart illustrating a data cache method according to an embodiment of the application. The data cache method may be applied to the cache memory device 300. As shown in FIG. 4, in step S410, the reservation station of the cache memory device 300 outputs a load instruction to the MOB circuit of the cache memory device 300.

In step S420, the first AGC of the MOB circuit generates a virtual address based on the load instruction from the reservation station.

In step S430, the compression circuit of the MOB circuit obtains the higher part of the virtual address from the first AGC and generates a target hash value based on the higher part of the virtual address.

In step S440, the second AGC of the MOB circuit generates the lower part of the virtual address based on the load instruction.

In step S450, the virtual tag (vtag) array of the MOB circuit obtains the lower part of the virtual address from the second AGC to select a set of memory units from the vtag array.

In step S460, the first comparator circuit of the MOB circuit compares the target hash value to the hash value of each memory unit of the selected set of memory units to generate a virtual tag hit signal or a virtual tag miss signal.

In step S470, when the first comparator circuit generates the virtual tag miss signal, the first comparator circuit transmits the virtual tag miss signal to the reservation station to indicate the reservation station to reserve the information related to the load instruction.

According to an embodiment of the application, in the data cache method, the vtag array comprises a plurality of sets of memory units. In addition, the hash value stored in each memory unit of each set of memory units is generated based on the higher part of the virtual address corresponding to each memory unit.

According to an embodiment of the application, in the data cache method, when the first comparator circuit generates the virtual tag hit signal, the first comparator circuit transmits the virtual tag hit signal to the correction circuit of the MOB circuit.

According to an embodiment of the application, in the data cache method, when the correction circuit receives the virtual tag hit signal and the physical tag hit signal, the correction circuit determines whether the first hit information corresponding to the virtual tag hit signal matches the second hit information corresponding to the physical tag hit signal. When the first hit information does not match the second hit information, the correction circuit updates the vtag array based on the second hit information and transmits the virtual tag hit signal, the physical tag hit signal and the synchronization information to the ROB of the cache memory device 300. Then, the ROB transmits the replay signal to the reservation station of the cache memory device 300.

According to another embodiment of the application, in the data cache method, when the correction circuit receives the virtual tag hit signal and the physical tag miss signal, the correction circuit transmits the virtual tag hit signal and the physical tag miss signal to the ROB. Then, the ROB transmits the replay signal to the reservation station of the cache memory device 300.

According to the data cache method provided in the application, when the "virtual tag miss" occurs, the MOB circuit may previously notify the reservation station reserving the information related to the load instruction without releasing the information related to the load instruction in the pipeline to avoid the cache pollution and avoid the replay operations triggered by the ROB. Additionally, according to the data cache method provided in the application, associated time delay for "cache miss" as well as the power consumption cost by the cache memory device may be reduced Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the application can be accomplished by many methods, and any specific configurations or functions in the disclosed embodiments only present a representative condition. Those who are skilled in this technology will understand that all of the disclosed aspects in the application can be applied independently or be incorporated.

While the application has been described by way of example and in terms of preferred embodiment, it should be understood that the application is not limited thereto. Those who are skilled in this technology may still make various alterations and modifications without departing from the scope and spirit of this application. Therefore, the scope of the present application shall be defined and protected by the following claims and their equivalents.

What is claimed is:

1. A cache memory device, comprising:
   a reservation station, outputting a load instruction; and
   a memory order buffer (MOB) circuit, coupled to the reservation station,
   wherein the MOB circuit comprises:
      a first address generation circuit (AGC), generating a virtual address based on the load instruction from the reservation station;
      a compression circuit, coupled to the first AGC, obtaining a higher part of the virtual address from the first AGC and generating a target hash value based on the higher part of the virtual address;
      a second AGC, generating a lower part of the virtual address based on the load instruction;
      a virtual tag array, coupled to the second AGC, obtaining the lower part of the virtual address from the second AGC and selecting a set of memory units from the virtual tag array; and
      a comparator circuit, coupled to the compression circuit and the virtual tag array, comparing the target hash value to a hash value stored by each memory unit of the set of memory units to generate a virtual tag hit signal or a virtual tag miss signal, wherein when the comparator circuit generates the virtual tag miss signal; the MOB circuit transmits the virtual tag miss signal to the reservation station.

2. The cache memory device of claim 1, wherein the virtual tag array comprises a plurality of sets of memory units, wherein the hash value stored by each memory unit of the plurality of sets of memory units is generated based on the higher part of the virtual address corresponding to each memory unit; and the MOB circuit transmits the virtual tag miss signal to the reservation station to indicate the reservation station to reserve information related to the load instruction.

3. The cache memory device of claim 1, wherein the MOB circuit further comprises a correction circuit, wherein the correction circuit is coupled to the comparator circuit, and wherein when the comparator circuit generates the virtual tag hit signal, the comparator circuit transmits the virtual tag hit signal to the correction circuit.

4. The cache memory device of claim 3, wherein when the correction circuit receives the virtual tag hit signal and a physical tag hit signal, the correction circuit determines whether first hit information corresponding to the virtual tag hit signal matches second hit information corresponding to the physical tag hit signal.

5. The cache memory device of claim 4, further comprising:
   a reorder buffer (ROB),
   wherein when the first hit information does not match the second hit information, the correction circuit updates the virtual tag array based on the second hit information and transmits the virtual tag hit signal, the physical tag hit signal and synchronization information to the ROB, and the ROB transmits a replay signal to the reservation station.

6. The cache memory device of claim 3, further comprising:
   a reorder buffer (ROB),
   wherein when the correction circuit receives the virtual tag hit signal and a physical tag miss signal, the correction circuit transmits the virtual tag hit signal and the physical tag miss signal to the ROB, and the ROB transmits a replay signal to the reservation station.

7. The cache memory device of claim 3, wherein the comparator circuit further comprising a first comparator circuit, a second comparator circuit and a third comparator circuit; wherein
   the first comparator circuit compares the target hash value generated by the compression circuit to the hash value in virtual tag array to determine whether the target hash value hits one way of a set of memory units;
   the second comparator circuit obtains the higher part VA[H] of the virtual address generated by the first AGC and determines whether the higher part VA[H] hits one way of the set of memory units;
   when the higher part VA[H] of the virtual address hits one way of the set of memory units, the second comparator circuit obtains the physical address PA corresponding to the higher part VA[H], and transmit the physical address PA to the third comparator circuit; and
   the third comparator circuit determines whether the higher part PA[H] of the physical address PA hits one way of the set of memory units.

8. The cache memory device of claim 7, wherein when the target hash value does not hit one way of the set of memory units, the first comparator circuit generates a virtual tag miss signal.

9. The cache memory device of claim 7, wherein when the higher part PA[H] hits one way of the set of memory units, the third comparator circuit asserts the physical tag hit signal, and when the higher part PA[H] does not hit any one way of the set of memory units, the third comparator circuit asserts the physical tag miss signal; the third comparator circuit transmits the physical tag hit signal or the physical tag miss signal to the correction circuit.

10. A data cache method, applied in a cache memory device, comprising:

outputting, by a reservation station of the cache memory device, a load instruction to a memory order buffer (MOB) circuit of the cache memory device;

generating, by a first address generation circuit (AGC) of the MOB circuit, a virtual address based on the load instruction from the reservation station;

obtaining, by a compression circuit of the MOB circuit, a higher part of the virtual address from the first AGC and generating, by the compression circuit, a target hash value based on the higher part of the virtual address;

generating, by a second AGC of the MOB circuit, a lower part of the virtual address based on the load instruction;

obtaining, by a virtual tag array of the MOB circuit, the lower part of the virtual address from the second AGC and selecting, by the virtual tag array, a set of memory units from the virtual tag array;

comparing, by a comparator circuit of the MOB circuit, the target hash value to a hash value stored by each memory unit of the set of memory units to generate a virtual tag hit signal or a virtual tag miss signal; and when the comparator circuit generates the virtual tag miss signal, transmitting, by the MOB circuit, the virtual tag miss signal to the reservation station.

11. The data cache method of claim 10, wherein the virtual tag array comprises a plurality of sets of memory units, wherein the hash value stored by each memory unit of the plurality of sets of memory units is generated based on the higher part of the virtual address corresponding to each memory unit and the MOB circuit transmits the virtual tag miss signal to the reservation station to indicate the reservation station to reserve information related to the load instruction.

12. The data cache method of claim 10, further comprising:

when the comparator circuit generates the virtual tag hit signal, transmitting, by the comparator circuit, the virtual tag hit signal to a correction circuit of the MOB circuit.

13. The data cache method of claim 12, further comprising:

when the correction circuit receives the virtual tag hit signal and a physical tag hit signal, determining, by the correction circuit whether a first hit information corresponding to the virtual tag hit signal matches a second hit information corresponding to the physical tag hit signal.

14. The data cache method of claim 13, further comprising:

when the first hit information does not match the second hit information, updating, by the correction circuit, the virtual tag array based on the second hit information;

transmitting, by the correction circuit, the virtual tag hit signal, the physical tag hit signal and synchronization information to a reorder buffer (ROB) of the cache memory device; and transmitting, by the ROB, a replay signal to the reservation station.

15. The data cache method of claim 12, further comprising:

when the correction circuit receives the virtual tag hit signal and a physical tag miss signal, transmitting, by the correction circuit, the virtual tag hit signal and the physical tag miss signal to a reorder buffer (ROB) of the cache memory device; and transmitting, by the ROB, a replay signal to the reservation station.

16. The data cache method of claim 12, wherein the comparator circuit further comprising a first comparator circuit, a second comparator circuit and a third comparator circuit, the method further comprises:

comparing, by the first comparator circuit, the target hash value generated by the compression circuit to the hash value in virtual tag array to determine whether the target hash value hits one way of a set of memory units;

obtaining, by the second comparator circuit, the higher part VA[H] of the virtual address generated by the first AGC and determines whether the higher part VA[H] hits one way of the set of memory units;

when the higher part VA[H] of the virtual address hits one way of the set of memory units, obtaining, by the second comparator circuit, the physical address PA corresponding to the higher part VA[H], and transmit the physical address PA to the third comparator circuit; and determining, by the third comparator circuit, whether the higher part PA[H] of the physical address PA hits one way of the set of memory units.

17. The data cache method of claim 16, further comprising:

when the target hash value does not hit one way of the set of memory units, generating, by the first comparator circuit, a virtual tag miss signal.

18. The data cache method of claim 16, further comprising:

when the higher part PA[H] hits one way of the set of memory units, asserting, by the third comparator circuit, the physical tag hit signal; and when the higher part PA[H] does not hit any one way of the set of memory units, asserting, by the third comparator circuit, the physical tag miss signal, and transmitting, by the third comparator circuit, the physical tag hit signal or the physical tag miss signal to the correction circuit.

* * * * *